United States Patent
Poteet et al.

(10) Patent No.: US 10,533,606 B2
(45) Date of Patent: Jan. 14, 2020

(54) AIR BEARING SHAFT ASSEMBLY WITH SURFACE LAYER

(71) Applicant: Hamilton Sundstrand Corporation, Charlotte, NC (US)

(72) Inventors: Steven Poteet, Hamden, CT (US); Blair A. Smith, South Windsor, CT (US); Kevin M. Rankin, Windsor, CT (US); William R. Fiske, Springfield, MA (US)

( * ) Notice: Subject to any disclaimer, the term of this patent is extended or adjusted under 35 U.S.C. 154(b) by 0 days.

(21) Appl. No.: 15/952,748

(22) Filed: Apr. 13, 2018

(65) Prior Publication Data

US 2019/0316632 A1 Oct. 17, 2019

(51) Int. Cl.
| | |
|---|---|
| F16C 17/04 | (2006.01) |
| F16C 33/14 | (2006.01) |
| F16C 17/26 | (2006.01) |
| F01D 25/16 | (2006.01) |
| F04D 29/05 | (2006.01) |
| F16C 33/10 | (2006.01) |
| F16C 32/06 | (2006.01) |
| F16C 33/04 | (2006.01) |

(52) U.S. Cl.
CPC ........ F16C 33/1095 (2013.01); F16C 17/042 (2013.01); F16C 32/0607 (2013.01); F16C 33/043 (2013.01); *F01D 25/16* (2013.01); *F01D 25/166* (2013.01); *F05D 2240/50* (2013.01); *F16C 33/1005* (2013.01); *F16C 2223/30* (2013.01); *F16C 2360/23* (2013.01)

(58) Field of Classification Search
CPC .... F16C 17/042; F16C 17/26; F16C 33/1005; F16C 33/1095; F16C 33/14; F16C 33/125; F16C 2206/04; F16C 2206/82; F16C 2202/54; F16C 2205/50; F16C 2205/54; F16C 2223/30; F16C 2223/60; F16C 2360/23; F16C 2360/24; F16F 2205/54; F01D 25/166; F01D 25/162; F04D 29/056; F05D 2240/54; F05D 2240/53
USPC .................. 384/103, 105, 114, 121; 394/109
See application file for complete search history.

(56) References Cited

U.S. PATENT DOCUMENTS 3,677,612 A * 7/1972 Barnett ................. F16C 17/024
384/103
5,866,518 A 2/1999 Dellacorte et al.
(Continued)

FOREIGN PATENT DOCUMENTS

DE 2649619 A1 * 7/1977 ............. B21D 53/10
EP 1754860 A2 2/2007
(Continued)

OTHER PUBLICATIONS

Extended European Search Report for EP Application No. 19160365.3, dated Aug. 19, 2019, 9 pages.

*Primary Examiner* — Marcus Charles
(74) *Attorney, Agent, or Firm* — Kinney & Lange, P.A.

(57) ABSTRACT

An example embodiment of an air bearing assembly includes a first member and a shaft with a flange configured to rotate with respect to the first member. The first member has a first coating on at least one first surface facing at least one second surface on the flange or the shaft. The first coating includes tungsten carbide, a nonpolymeric self-lubricating coating, or a combination thereof. At least one of the second surfaces has a second coating on a surface facing the first coating.

15 Claims, 3 Drawing Sheets

(56) References Cited

U.S. PATENT DOCUMENTS

| | | |
|---|---|---|
| 6,698,930 B2 | 3/2004 | Akizuki et al. |
| 6,702,463 B1 * | 3/2004 | Brockett ............... F16C 17/042 |
| | | 384/103 |
| 6,956,718 B1 | 10/2005 | Kulkarni et al. |
| 7,297,367 B2 | 1/2007 | Oboodi et al. |
| 7,615,291 B2 | 10/2009 | Lee et al. |
| 8,002,469 B2 | 8/2011 | Woydt |
| 8,039,096 B2 | 10/2011 | Lee et al. |
| 8,147,143 B2 * | 4/2012 | Struziak ............... F16C 17/042 |
| | | 384/103 |
| 8,158,205 B2 | 4/2012 | Oboodi et al. |
| 8,419,905 B2 | 4/2013 | Ueda et al. |
| 8,753,417 B1 | 7/2014 | DellaCorte et al. |
| 9,347,484 B2 | 5/2016 | Cooley et al. |
| 9,359,908 B2 | 6/2016 | Bidkar et al. |
| 9,587,746 B2 | 3/2017 | Bidkar et al. |
| 9,658,597 B2 | 5/2017 | Dubois et al. |
| 9,677,609 B2 * | 6/2017 | Omori ................... F01D 25/168 |
| 9,694,941 B2 | 7/2017 | Boisseau et al. |
| 9,702,401 B2 | 7/2017 | Gonzalez |
| 9,726,220 B2 * | 8/2017 | Kim ........................ F16C 27/02 |
| 9,765,635 B2 | 9/2017 | Gorokhovsky |
| 9,841,054 B2 | 12/2017 | Rosenholm et al. |
| 10,012,109 B2 * | 7/2018 | Yoshino ................ F16C 17/024 |
| 2004/0092405 A1 * | 5/2004 | Konishi ................. C10M 163/00 |
| | | 508/110 |
| 2004/0120617 A1 * | 6/2004 | Fournier ............... F16C 17/042 |
| | | 384/105 |
| 2004/0179759 A1 | 9/2004 | Katou et al. |
| 2004/0241448 A1 * | 12/2004 | Kano ................... C10M 141/10 |
| | | 428/408 |
| 2007/0003693 A1 | 1/2007 | Lee et al. |
| 2007/0205001 A1 * | 9/2007 | Shuster ................... B21D 39/04 |
| | | 166/380 |
| 2010/0310763 A1 * | 12/2010 | Oboodi ..................... B22F 7/04 |
| | | 427/191 |
| 2014/0169707 A1 * | 6/2014 | Yoshino ............... F16C 17/042 |
| | | 384/105 |
| 2015/0132539 A1 * | 5/2015 | Bailey ................... C23C 28/042 |
| | | 428/141 |
| 2015/0168603 A1 * | 6/2015 | Ohtake ..................... C08K 5/544 |
| | | 264/1.1 |
| 2015/0184540 A1 | 7/2015 | Winkler et al. |
| 2016/0010439 A1 | 1/2016 | Parmeter et al. |
| 2016/0319859 A1 * | 11/2016 | Omori ................... F16C 17/042 |
| 2016/0377119 A1 | 12/2016 | Rocchi et al. |
| 2017/0122205 A1 | 5/2017 | Ertas et al. |

FOREIGN PATENT DOCUMENTS

| | | | | |
|---|---|---|---|---|
| EP | 2177580 A1 * | 4/2010 | ............ | A47J 36/025 |
| EP | 3101291 A1 * | 12/2016 | ............ | F16C 17/042 |

* cited by examiner

AIR BEARING SHAFT ASSEMBLY WITH SURFACE LAYER

BACKGROUND

This disclosure relates generally to air bearings, and more specifically, to air bearings for operation at higher temperatures.

Air bearing assemblies require airfoil bearings to provide lubrication, lowering torque, to generate an air film for the bearing to operate. Current airfoil bearing coatings use polymeric coatings, such as Teflon and particle-filled polyimides, and are limited by their operating temperatures and expensive to manufacture. Lower temperature thresholds require excess bleed air to operate, lowering efficiency, while the application of such coatings requires extensive labor.

SUMMARY

An example embodiment of an air bearing assembly includes a first member and a shaft with a flange configured to rotate with respect to the first member. The first member has a first coating on at least one first surface facing at least one second surface on the flange or the shaft. The first coating includes tungsten carbide, a nonpolymeric self-lubricating coating, or a combination thereof. At least one of the second surfaces has a second coating on a surface facing the first coating.

An example embodiment of a method of making an air bearing assembly includes providing a first member and a shaft with a flange configured to rotate with respect to the first member. A first coating is applied to at least one surface of the member configured to face the shaft or the flange. The first coating includes tungsten carbide, a nonpolymeric self-lubricating coating, or a combination thereof. A second coating is applied to at least one second surface of the shaft or the flange, facing the at least one first surface. The first stationary member is assembled to the shaft or the flange to form the air bearing assembly.

DETAILED DESCRIPTION

Vapor deposition of hard, self-lubricating materials can provide the lubricity to create an air film with minimal torque. The entire foil bearing could be coated which would prevent wear and lower friction. In addition, smooth surfaces resulting from CVD/PVD would not need to be post-coat machined, lowering costs substantially. Coating materials are self-lubricating, and the lubricious polymeric matrix required for other coatings, such as chromated or fluorinated coatings, can be eliminated which leads to lower total manufacturing cost, ability to operate at higher temperatures, and systems that are environmentally favorable.

Figure 1A:
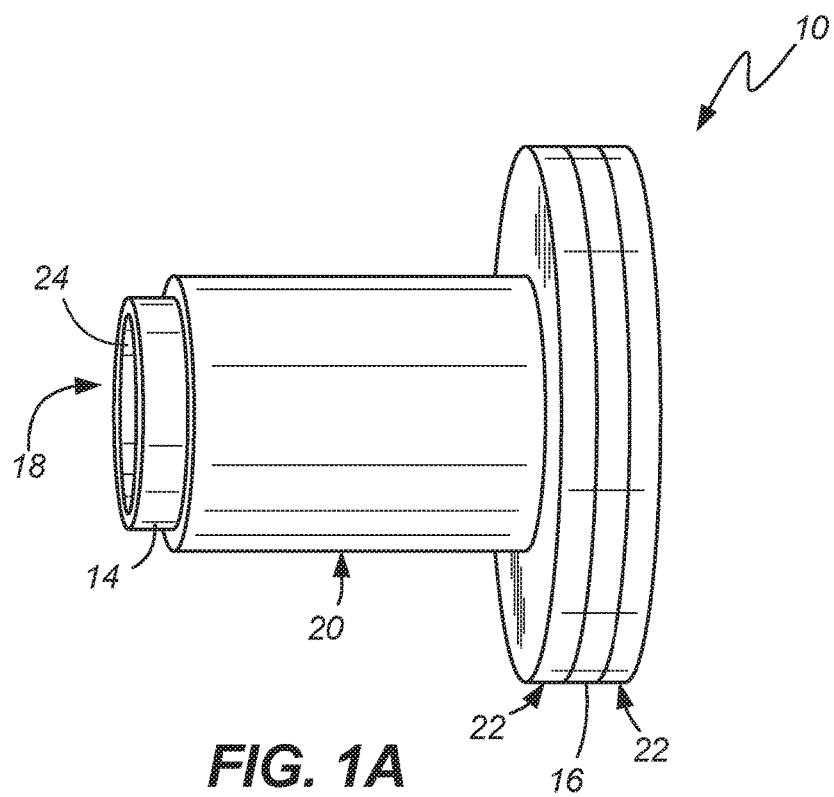
FIG. 1A shows an air bearing assembly with a journal and foil bearing.
Figure 1B:
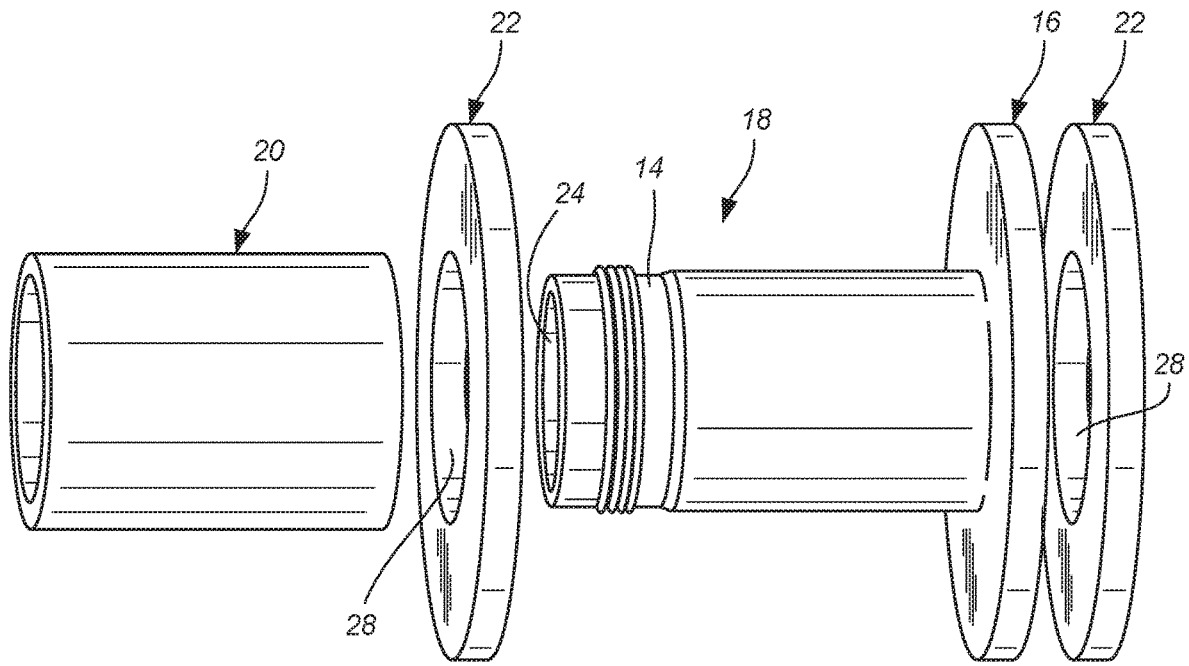
FIG. 1B is an exploded view of the example air bearing assembly in FIG. 1A.

FIGS. 1A and 1B show an embodiment of air bearing assembly 10, a non-limiting example that can be installed in a gas turbine engine (not shown). Air bearing assembly 10 includes at least a first stationary member, with shaft 14 and flange 16 configured to rotate with respect to at least the first stationary member, which can include, for example, journal 20 or foil bearing(s) 22. In this example, journal 20 is arranged on shaft 14, and one or more foil bearings 22, which may be spring-loaded, are disposed adjacent flange 16.

When air bearing unit 18 (specifically shaft 14 and flange 16) is in normal operation, rotating around its design operating speed, rotation relative to stationary elements 20, 22 causes a thin, high-pressure film of air to form therearound, separating air bearing unit 18 from journal 20 and foil bearings 22. This allows air bearing unit 18, which in some examples is made of steel, to rotate in a near frictionless manner.

Shaft 14 includes opening 24, which is configured to receive a drive or other power shaft (not shown). For example, the omitted drive shaft can be connected to a component of a gas turbine engine or air cycle machine (ACM).

During times when air bearing unit 18 is not rotating at its intended operating speed, for example during spin-up or spin-down of the engine or ACM, shaft 14 and flange 16 frequently contact journal 20 and/or foil bearings 22, and wear can occur on the surfaces in contact. During spin-up, air bearing unit 18 rotates with increasing speed until it reaches the normal operating speed, while during spin-down, the air bearing unit 18 decreases rotational speed to a lower speed or stationary position.

Figure 2A:
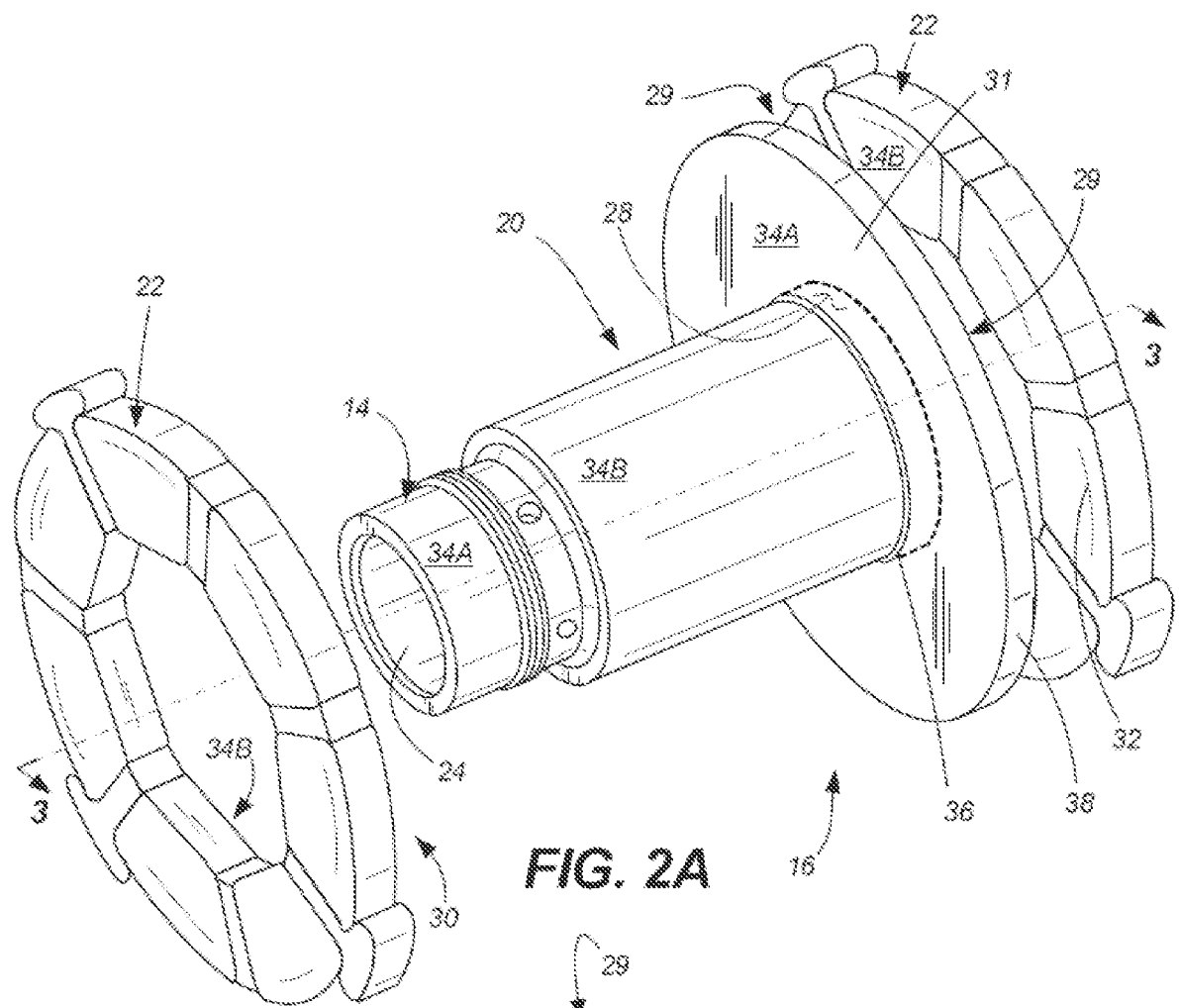
FIG. 2A shows an isometric view of the foil bearings interacting in the air bearing assembly of FIGS. 1A and 1B.
Figure 2B:
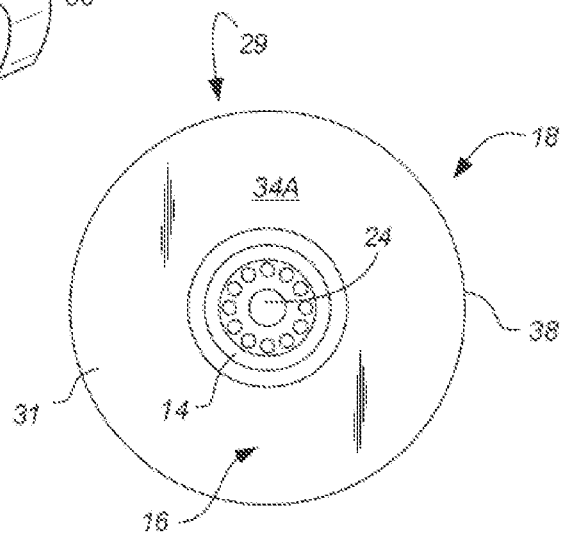
FIG. 2B is a view of an air bearing unit facing the shaft and flange.
Figure 3:
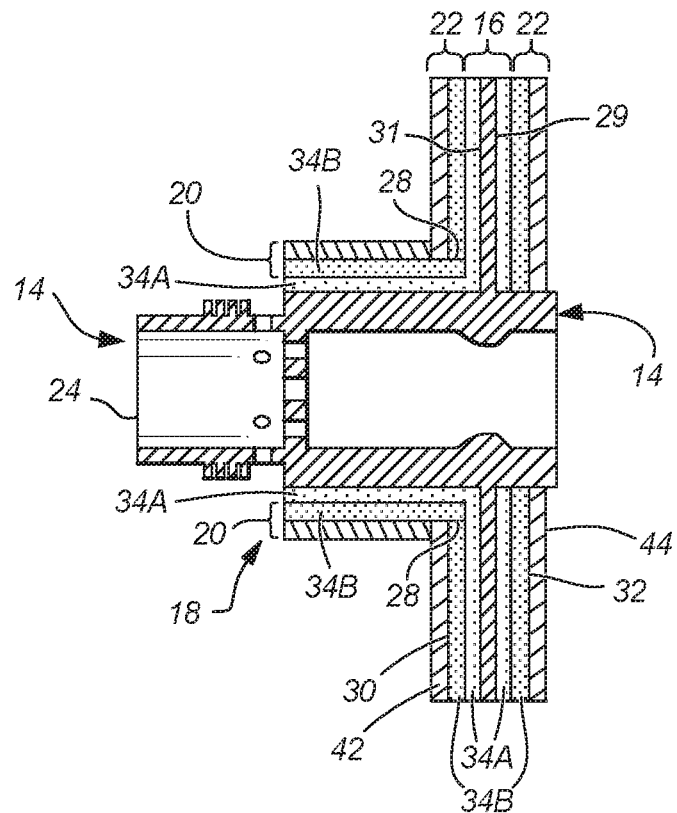
FIG. 3 shows a sectional view taken along 3-3 in FIG. 2A of the foil bearings, shaft, and flange.

Thus FIGS. 2A, 2B, and 3 (taken across line 3-3 of FIG. 2A, also representing a rotational axis of unit 18) show one or more stationary members, such as journal 20 and/or foil bearings 22. Air bearing unit 18 has coatings 34A, 34B on one or more respective surface(s) 28, 29, 30, 31, 32 including surfaces on shaft 14 and/or flange 16. Coating 34A is a hard coating that can withstand the operational environment of the air bearing assembly 10 (which includes high temperatures and/or pressures) and withstand wear on unit 18 during spin-up or spin-down. Coatings 34A, 34B, which may vary in composition and/or thickness among one or more surfaces 28-32, can include tungsten carbide, a nonpolymeric self-lubricating coating, or a combination thereof. In particular embodiments, at least coating 34B should be self-lubricating. Certain embodiments of coatings 34A, 34B can withstand an operating temperature above 550° F. (about 290° C.), and in certain of those embodiments, the coating can withstand an operating temperature above 750° F. (about 400° C.). Coating 34A and optionally 34B each has a hardness of about 600 Vickers or greater according to a Vickers microindentation hardness test per ASTM E384. Coating 34A can be up to about 0.002 inch (50 microns) thick, while coating 34B on the stationary element(s) can range from about 0.00004 inch (1 micron) thick to about 0.002 inch (50 microns) thick.

In certain embodiments, coatings 34A, 34B, as well as precursors of one or both coatings, are free from hexavalent chrome. Such hexavalent chrome-based coatings and precursors have been used to form hard coatings for elements like air bearing units 18 due to their relative availability and ease of use. However, hexavalent chrome-based coatings, and certain other coating are carcinogenic and otherwise not environmentally friendly. The application and machining of many predominantly hexavalent chrome-based coatings (for example, by plating) also can be expensive. Further, many of such coatings are not self-lubricating and thus require the addition of an organic polymer that contains fillers which are necessary to provide lubrication. As a result, conventional air bearing coatings have maximum temperature thresholds of between about 450° F. (about 230° C.), and no more than 550° F. (288° C.), limiting the operating environments for conventional air bearings.

Additionally, application of predominantly hexavalent-chrome coatings and precursors typically requires electroplating, which can be difficult to reliably perform on geometrically complex substrates. In particular, due to the shape of journal 20, and/or foil bearings 22, electrodeposition can result in the deposition of too much coating material at corner 36 of journal 20 or outer peripheral surface 38. Such non-uniform coating deposition makes it difficult to meet thickness and dimensional requirements requiring costly post-machining procedures to maintain the extremely small tolerances required for efficient air bearing assembly operation. Thus, in some examples, coating 34A can be applied by a method, such as plasma spraying, chemical vapor deposition (CVD) or physical vapor deposition (PVD).

As referenced in FIGS. 1A and 1B, a second stationary member can be disposed on a side of flange 16 opposite the first stationary member (journal 20 or foil bearing 22). The second stationary member can be a second foil bearing 22 which optionally has coating 34B on surface 32 facing flange 16, the coating comprising tungsten carbide, a nonpolymeric self-lubricating coating, or a combination thereof.

Figure 4:
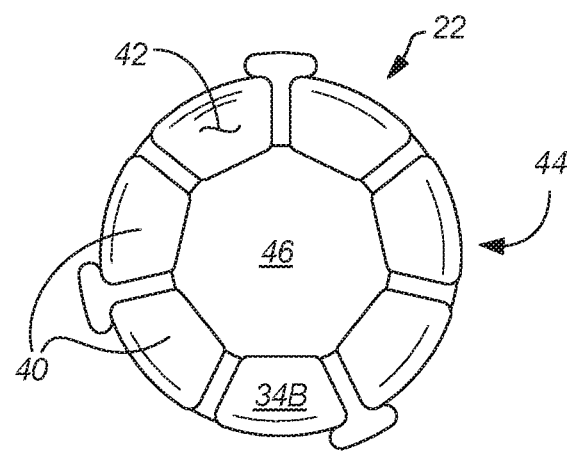
FIG. 4 shows an example foil bearing for an air bearing assembly.

FIG. 4 shows foil bearing 22 with a plurality of foils 40. Foil bearing has first side 42, second opposing side 44, and opening 46 centered therethrough for receiving shaft 14 of air bearing unit 18 (shown in FIGS. 1A-2). Coating 34B is disposed on at least one surface including at least first side 42 or second side 44. One or more foils 40 may be convex to facilitate formation of the air film.

In certain embodiments, coating 34B includes tungsten carbide, a nonpolymeric self-lubricating coating, or a combination thereof. In a particular example, coating 34B is self-lubricating. As mentioned regarding FIGS. 1A and 1B, lubrication facilitates rotation of air bearing unit 18 with respect to stationary element(s) such as journal 20 and foil bearings 22 during spin-up and spin-down, prior to the formation of the air film at an intersection thereof. For instance, one or both foil bearings 22 require lubrication at one or more of surfaces including at least first side 42 or second side 44 of foil bearings 22. Preferably, both foil bearings 22 are arranged with a coated surface facing toward flange 16.

Self-lubricating coatings eliminate the need for separate lubricants or fluorinated polymer coatings which act as lubricants. Fluorinated polymer coatings in particular cannot withstand high temperatures, limiting suitable operating environments. Therefore, self-lubricating coatings provide not only cost savings and a reduction in manufacturing complexity for foil bearings 22, but also allow foil bearings 22 (and in turn an air bearing assembly) to be used in a wider range of applications. In a particular example, the self-lubricating coating is selected from a group consisting of: diamond-like carbon (DLC), WS2, WSi2, AgO, h-BN, $MoS_2$, and combinations thereof.

Another example of a self-lubricating coating is PS400, developed by NASA, which is composed of 70% by weight Nickel-Molybdenum-Aluminum binder, 20% by weight chromium oxide binder, 5% by weight silver solid lubricant, and 5% by weight $BaF_2$ or $CaF_2$ solid lubricant. PS400 can be applied to shaft 14, for example, by plasma spraying. PS400 can withstand temperatures of up to 930° F. (about 500° C.). Other example self-lubricating coatings 34A, 34B are free of hexavalent chrome or other known carcinogenic compounds and precursors. One example is a diamond-like carbon ("DLC") coating. An example DLC coating includes silicon oxide and/or silver/silver oxide, and is applied by PVD. Another example DLC coating includes tungsten (tungsten carbide carbon, or WCC, or WC/C, or Tungsten-DLC), and is applied by a type of PVD known as plasma assisted physical vapor deposition (PAPVD). The Tungsten-DLC coating has a thickness of about 0.0002 inches (5 microns) or less.

Another example chromium-free self-lubricating coating is a boron/aluminum/magnesium ("BAM")-based (formally $AlMgB_{14}$, but sometimes closer to $Al_{0.75}Mg_{0.75}B_{14}$). This coating can be applied by CVD, PVD, or a plasma spray process, the latter of which can only be applied to the shaft and not the foil bearing. BAM-based coatings can include dopants such as $TiB_2$ in some examples, or ceramic dopants in other examples.

In another example, coating 34A is a tungsten-carbide-based coating. The tungsten-carbide-based coating is applied by CVD. The tungsten-carbide-based coating can be applied to shaft 14, against a self-lubricating foil bearing, and can withstand temperatures up to about 750° F. (about 400° C.), and provides a more abrasion- and corrosion-resistant surface than a predominantly chromium-based coating. While free from hexavalent chromium, however, the tungsten-carbide-based coating is not self-lubricating. As such, self-lubricating organic polymers as were generally discussed above can be provided to foil bearing 22. Like most suitable coatings 34A, 34B described herein, the tungsten-carbide-based coating is free from chromium and/or fluorine.

Discussion of Possible Embodiments

The following are non-exclusive descriptions of possible embodiments of the present invention.

An example embodiment of an air bearing assembly includes a first member and a shaft with a flange configured to rotate with respect to the first member. The first member has a first coating on at least one first surface facing at least one second surface on the flange or the shaft. The first coating includes tungsten carbide, a nonpolymeric self-lubricating coating, or a combination thereof. At least one of the second surfaces has a second coating on a surface facing the first coating.

The air bearing assembly of the preceding paragraph can optionally include, additionally and/or alternatively, any one or more of the following features, configurations and/or additional components:

An air bearing assembly according to an exemplary embodiment of this disclosure, among other possible things includes a first member; and a shaft with a flange configured to rotate with respect to the first member; wherein the first member has a first coating on at least one first surface facing at least one second surface on the flange or the shaft, the first coating comprising tungsten carbide, a nonpolymeric self-lubricating coating, or a combination thereof; and wherein at least one of the second surfaces has a second coating on a surface facing the first coating.

A further embodiment of the foregoing air bearing assembly, wherein the first member is one of a stationary journal and a stationary foil bearing.

A further embodiment of any of the foregoing air bearing assemblies, wherein the first coating can withstand an operating temperature above 550° F. (about 288° C.).

A further embodiment of any of the foregoing air bearing assemblies, wherein the first coating can withstand an operating temperature above 750° F. (about 400° C.).

A further embodiment of any of the foregoing air bearing assemblies, wherein the first coating has a thickness greater than about 0.00004 inch (1 micron) and less than about 0.002 inch (50 microns).

A further embodiment of any of the foregoing air bearing assemblies, wherein the second coating comprises tungsten carbide, a nonpolymeric self-lubricating coating, or a combination thereof.

A further embodiment of any of the foregoing air bearing assemblies, wherein the second coating has a hardness of about 600 Vickers or greater according to a Vickers microindentation hardness test per ASTM E384.

A further embodiment of any of the foregoing air bearing assemblies, wherein the second coating has a thickness less than about 0.002 inch (50 microns).

A further embodiment of any of the foregoing air bearing assemblies, wherein the first coating is free of fluorinated compounds.

A further embodiment of any of the foregoing air bearing assemblies, wherein the self-lubricating coating is selected from a group consisting of: diamond-like carbon (DLC), $WS_2$, $WSi_2$, AgO, Ag, BN, $MoS_2$, and combinations thereof.

A further embodiment of any of the foregoing air bearing assemblies, further comprising: a second stationary member disposed on a side of the flange opposite the first stationary member, wherein the second stationary member has a third coating on a surface facing the flange, the third coating comprising tungsten carbide, a nonpolymeric self-lubricating coating, or a combination thereof.

An example embodiment of a method of making an air bearing assembly includes providing a first member and a shaft with a flange configured to rotate with respect to the first member. A first coating is applied to at least one surface of the member configured to face the shaft or the flange. The first coating includes tungsten carbide, a nonpolymeric self-lubricating coating, or a combination thereof. A second coating is applied to at least one second surface of the shaft or the flange, facing the at least one first surface. The first stationary member is assembled to the shaft or the flange to form the air bearing assembly.

The preceding method can optionally include, additionally and/or alternatively, any one or more of the following features, configurations and/or additional components:

A method according to an exemplary embodiment of this disclosure, among other possible things includes providing a first member and a shaft with a flange configured to rotate with respect to the first member; applying a first coating to at least one surface of the member configured to face the shaft or the flange, the first coating comprising tungsten carbide, a nonpolymeric self-lubricating coating, or a combination thereof; applying a second coating to at least one second surface of the shaft or flange, facing the at least one first surface; and assembling the first member to the shaft or the flange to form the air bearing assembly.

A further embodiment of the foregoing method, wherein the first member is one of a stationary journal and a stationary foil bearing.

A further embodiment of any of the foregoing methods, wherein the foil bearing comprises a plurality of convex foils arranged generally about a rotational axis to form a foil bearing, the foil bearing having a first side, a second opposing side, and an opening centered therethrough, about the rotational axis.

A further embodiment of any of the foregoing methods, wherein the first coating is applied to the first stationary member by one of chemical vapor deposition and physical vapor deposition.

A further embodiment of any of the foregoing methods, wherein the first coating comprises tungsten carbide, a nonpolymeric self-lubricating coating, or a combination thereof.

A further embodiment of any of the foregoing methods, wherein the self-lubricating coating is selected from a group consisting of: diamond-like carbon (DLC), $WS_2$, $WSi_2$, AgO, Ag, BN, $MoS_2$, and combinations thereof.

A further embodiment of any of the foregoing methods, wherein the first coating is greater than about 0.00004 inch (1 micron) thick.

A further embodiment of any of the foregoing methods, wherein the second coating comprises tungsten carbide, a nonpolymeric self-lubricating coating, or a combination thereof.

A further embodiment of any of the foregoing methods, wherein the first coating can withstand an operating temperature above 550° F. (about 288° C.).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air bearing assembly, comprising:
   a journal; and
   a shaft configured to rotate with respect to the journal;
   a flange connected to and extending from an end of the shaft;
   wherein the journal has a first coating disposed on a first surface facing a second surface on the shaft, the first coating comprising tungsten carbide, a nonpolymeric self-lubricating coating, or a combination thereof; and
   wherein the second surface has a second coating disposed on a surface that faces the first coating, the second coating comprising tungsten carbide, a nonpolymeric self-lubricating coating, or a combination thereof.

2. The air bearing assembly of claim 1, wherein the first coating can withstand an operating temperature above 550° F. (about 288° C.).

3. The air bearing assembly of claim 1, wherein the first coating can withstand an operating temperature above 750° F. (about 400° C.).

4. The air bearing assembly of claim 1, wherein the first coating has a thickness greater than about 0.00004 inches (1 micron) and less than about 0.002 inches (50 microns).

5. The air bearing assembly of claim 1, wherein the second coating has a hardness of 600 Vickers or greater according to a Vickers microindentation hardness test per ASTM E384.

6. The air bearing assembly of claim 1, wherein the second coating has a thickness less than about 0.002 inches (50 microns).

7. The air bearing assembly of claim 1, wherein the self-lubricating coating is selected from a group consisting of: diamond-like carbon (DLC), $WS_2$, $WSi_2$, AgO, Ag, BN, $MoS_2$, and combinations thereof.

8. The air bearing assembly of claim 1, further comprising:
a second member disposed on a side of the flange opposite the journal, wherein the second member has a third coating on a third surface facing the flange, the third coating comprising tungsten carbide, a nonpolymeric self-lubricating coating, or a combination thereof.

9. A method of making an air bearing assembly, the method comprising:
providing a journal and a shaft configured to rotate with respect to the journal;
applying a first coating to a first surface of the journal, wherein the first surface of the journal faces the shaft, wherein the first coating comprises tungsten carbide, a nonpolymeric self-lubricating coating, or a combination thereof;
applying a second coating to a second surface of the shaft, wherein the second surface faces the first surface; and
assembling the journal to the shaft to form the air bearing assembly.

10. The method of claim 9, wherein the first coating is applied to the journal by one of chemical vapor deposition and physical vapor deposition.

11. The method of claim 9, wherein the first coating comprises tungsten carbide, a nonpolymeric self-lubricating coating, or a combination thereof.

12. The method of claim 11, wherein the self-lubricating coating is selected from a group consisting of: diamond-like carbon (DLC), $WS_2$, $WSi_2$, AgO, Ag, BN, $MoS_2$, and combinations thereof.

13. The method of claim 9, wherein the first coating is greater than about 0.00004 inches (1 micron) thick.

14. The method of claim 9, wherein the second coating comprises tungsten carbide, a nonpolymeric self-lubricating coating, or a combination thereof.

15. The method of claim 9, wherein the first coating can withstand an operating temperature above 550° F. (about 288° C.).

* * * * *

UNITED STATES PATENT AND TRADEMARK OFFICE
CERTIFICATE OF CORRECTION

PATENT NO. : 10,533,606 B2
APPLICATION NO. : 15/952748
DATED : January 14, 2020
INVENTOR(S) : Steven Poteet et al.

Page 1 of 1

It is certified that error appears in the above-identified patent and that said Letters Patent is hereby corrected as shown below:

In the Claims

Column 7, Line 14 Delete "shaft configured" Insert -- shaft with a flange configured --

Signed and Sealed this
Twenty-fourth Day of March, 2020

Andrei Iancu
*Director of the United States Patent and Trademark Office*